United States Patent
Chen et al.

(10) Patent No.: US 9,613,424 B2
(45) Date of Patent: Apr. 4, 2017

(54) METHOD OF CONSTRUCTING 3D CLOTHING MODEL BASED ON A SINGLE IMAGE

(71) Applicant: BEIHANG UNIVERSITY, Beijing (CN)

(72) Inventors: Xiaowu Chen, Beijing (CN); Qiang Fu, Beijing (CN); Qinping Zhao, Beijing (CN); Bin Zhou, Beijing (CN); Kan Guo, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 14/990,470

(22) Filed: Jan. 7, 2016

(65) Prior Publication Data
US 2016/0155262 A1    Jun. 2, 2016

Related U.S. Application Data

(63) Continuation-in-part of application No. 14/444,315, filed on Jul. 28, 2014, now abandoned.

(30) Foreign Application Priority Data

Sep. 23, 2013  (CN) .......................... 2013 1 0435284

(51) Int. Cl.
| | |
|---|---|
| *G06T 17/00* | (2006.01) |
| *G06T 7/00* | (2017.01) |
| *G06K 9/00* | (2006.01) |
| *G06K 9/46* | (2006.01) |
| *G06K 9/52* | (2006.01) |
| *G06T 19/00* | (2011.01) |

(Continued)

(52) U.S. Cl.
CPC ........ *G06T 7/0051* (2013.01); *G06K 9/00369* (2013.01); *G06K 9/4604* (2013.01); *G06K 9/52* (2013.01); *G06T 7/50* (2017.01); *G06T 7/75* (2017.01); *G06T 17/00* (2013.01); *G06T 19/00* (2013.01); *G06T 2207/20092* (2013.01); *G06T 2207/30124* (2013.01); *G06T 2210/16* (2013.01)

(58) Field of Classification Search
CPC ........................... G06T 2210/16; G06T 17/00
See application file for complete search history.

(56) References Cited

U.S. PATENT DOCUMENTS

| | | |
|---|---|---|
| 2005/0093858 A1 | 5/2005 | Tsai et al. |
| 2006/0125830 A1 | 6/2006 | Piponi |

(Continued)

*Primary Examiner* — Jeffrey Chow
(74) *Attorney, Agent, or Firm* — Global IP Counselors, LLP (57) ABSTRACT

A method of constructing 3D clothing model based on single image, estimating a 3D model of human body of an inputted image and constructing 3D clothing plane according to the clothing silhouette of the inputted image. The method includes utilizing the 3D clothing plane and the 3D model of human body to generate a smooth 3D clothing model through a deformation algorithm. A decomposition algorithm of intrinsic image is utilized along with a shape-from-shading algorithm to acquire a set of detail information of clothing from the inputted image. A weighted Laplace editing algorithm is utilized to shift the acquired detail information of clothing to the smooth 3D clothing model to yield a final 3D clothing model. A 3D clothing model is used to generate the surface geometry details including folds, wrinkles.

8 Claims, 2 Drawing Sheets

(51) Int. Cl.
*G06T 7/73* (2017.01)
*G06T 7/50* (2017.01)

(56) References Cited

U.S. PATENT DOCUMENTS

| | | |
|---|---|---|
| 2007/0273711 A1 | 11/2007 | Maffei |
| 2010/0111370 A1* | 5/2010 | Black ................. G06K 9/00369 382/111 |
| 2011/0069866 A1 | 3/2011 | Kim et al. |
| 2011/0273457 A1 | 11/2011 | De Aguiar et al. |
| 2011/0296331 A1 | 12/2011 | Iyer et al. |
| 2011/0310086 A1* | 12/2011 | Massen ................... G06T 17/00 345/419 |
| 2012/0306919 A1 | 12/2012 | Suzuki et al. |
| 2013/0046522 A1 | 2/2013 | Kavan et al. |
| 2013/0113789 A1 | 5/2013 | Suzuki |
| 2013/0113830 A1 | 5/2013 | Suzuki |
| 2014/0043328 A1 | 2/2014 | Chen et al. |
| 2014/0249961 A1 | 9/2014 | Zagel et al. |
| 2014/0300635 A1* | 10/2014 | Suzuki .................. G06T 19/006 345/633 |
| 2014/0368499 A1 | 12/2014 | Kaur |

* cited by examiner

METHOD OF CONSTRUCTING 3D CLOTHING MODEL BASED ON A SINGLE IMAGE

CROSS-REFERENCE TO RELATED APPLICATIONS

This application is a continuation-in-part application of U.S. patent application Ser. No. 14/444,315 filed on Jul. 28, 2014, which claims priority to Chinese Patent Application No. 201310435284.2, filed Sep. 23, 2013. The entire disclosures of U.S. patent application Ser. No. 14/444,315 and Chinese Patent Application No. 201310435284.2 are hereby incorporated herein by reference.

TECHNICAL FIELD

The invention relates to the technical fields of computer graphics, computer vision and virtual reality, specifically to a method of constructing 3D clothing model based on single image (an inputted image).

BACKGROUND OF THE INVENTION

The construction of 3D model of scene object based on image is an important component of generating virtual reality and virtual scene. Particularly, the construction of 3D model of scene object of non-rigid deformation such as clothing is the research focus of international frontier at present. 3D clothing model with strong sense of reality is of a value to be widely applied.

The conventional methods to construct clothing 3D clothing model refer to the processes of actual processes of designing and cutting a clothing and establish the steps including 2D pattern design, physical simulation, etc and utilize the human-involved parameter iterative optimization to create a final 3D clothing model. The conventional methods of constructing 3D model clothing depend too much on manual operation and consume a large amount of time in physical simulation. Meanwhile, a higher level of knowledge in clothing field is needed for a person to perform modeling, so these methods are difficult to get popular in non-professionals.

The method of constructing 3D clothing model based on sketch allows the user to design the silhouette and detail information of clothing directly on a model of human body. So the 3D clothing is modeled as a surface offset to the model of human body. In particular, the researchers of the University of British Columbia recently propose a method of analyzing the sketch of clothing with sensitive content which calculates the tension degree between a clothing and human body to successfully improve modeling quality in the loose areas of clothing. However, most of the existing methods of constructing 3D clothing model based on sketch have many limitations in human poses and user interaction. Specifically, on one hand, the existing methods require a standing pose of the model of human body and the skeleton movements are limited in 2D image plane; on the other hand, the existing methods require the user to design manually silhouette and details of clothing (such as folds and wrinkles, etc) and hence a higher level of professional knowledge is needed for an user.

The technology of 3D clothing acquisition without marker utilizes multiple synchronized cameras to construct a 3D clothing model through a series of steps as keeping space-time consistency, re-meshing and 3D deformation, etc. The latest technology of acquiring the movement of human body also utilizes several cameras in synchronization and can approximately model an human body wearing movement clothing. Both of the methods introduced above depend on a professional-level environment of multi-view modeling and so can only be used in the laboratories.

The researchers of Max Planck Institute of Germany present a method of acquiring the surface details of 3D clothing through utilizing the active lights and a photometric stereo reconstruction algorithm. However, this method is complex in modeling environment which needs setting not only multiple cameras of multi-spectrum and also setting the particular light sources after calibrated. The researchers of the University of British Columbia utilize a multi-view video of clothing movement to restore the surface details of 3D clothing through a space-time deformation method and the clothing edges in video images. This method also needs a multi-view modeling environment and depends partially some man-machine interaction during the course of designing clothing edge.

In conclusion, the existing methods of constructing 3D clothing model depend to a greater degree on setting a multi-view modeling environment and are difficult to be applied in complex 3D poses of human body and difficult to automatically acquire the geometry details of clothing surface.

SUMMARY OF THE INVENTION

In light of the practical demands and the key problems of constructing 3D clothing model for the object of human body, the purpose of the present invention is to provide a computer with programming to perform steps of a method of constructing 3D clothing model based on single image inputted into the computer, the computer needing merely the single image to create 3D clothing model with rich surface geometry details such as folds and wrinkles, etc to overcome the shortcomings of the existing methods in setting multi-view modeling environment, acquiring verisimilar surface geometry details and complex 3D poses of human body, etc.

In order to realize the purpose, the present invention employs a technical solution as follows:

A method of constructing 3D clothing model based on single image, characterized in that it comprises the steps performed by the computer as follows:

Step 1: To estimate 3D model of human body of and construct 3D clothing plane according to the clothing silhouette of the input image (an inputted image) and display the model of the human body on a computer display which defines an input image.

First, utilize a method of semi-automatic 3D pose estimation method to estimate 3D pose(s) of human body of the input image according to 2D joint(s) of human body in the input image specified by user viewing the model of the human body (the input image) on the computer display; estimate the 3D model of human body in the input image through a method of deformable template according to a human contour line specified in the input image by user and the estimated 3D pose(s) of human body; specify the clothing silhouette by user in the input image; utilize the estimated 3D model of human body to divide the clothing silhouette specified by user into silhouette edge and boundary outline.

Then, the computer calculates the projection area of 3D model of human body on the image and the skeleton(s) related to clothing area; calculates a directed surface for each skeleton related to the clothing area through 3D coordinate(s) of skeleton joint(s) and a relative rotation matrix; calculate an intersection line between adjacent directed surfaces which is used to calculate an internal cutting line of the clothing area of the input image; utilize the internal cutting line to divide the clothing area of the input image into different parts of which each corresponds to one directed surface.

The computer then projects the outline and the internal cutting line of each part of the clothing area of the input image on the corresponding directed surface to form 3D clothing area of each part accordingly on the computer display; triangulates the 3D clothing area of each part and utilize the apex(es) of the common internal cutting lines between different 3D clothing areas to form an initial 3D clothing plane which is also displayed on the computer display.

Finally, duplicate the initial 3D clothing plane; utilize the apex(es) of the silhouette edge on the initial 3D clothing plane as the common apex(es) to combine these initial 3D clothing planes before and after duplication to form a final 3D clothing plane that is also displayed on the computer display.

Step 2: To utilize the final 3D clothing plane and the 3D model of human body to yield a smooth 3D clothing model through a deformation algorithm and display the smooth 3D clothing model on the computer display.

Firstly, the computer utilizes a Laplace deformation algorithm to deform the final 3D clothing plane under a set of constraints of outline apex(es) and the 3D model of human body to initialize a 3D clothing model. Then the computer calculates the tension degree of each apex of the initial 3D clothing model through calculating the shortest distance between the apex(es) of silhouette edge and the surface of the 3D model of human body. Finally the computer utilizes the rotating surface as the deformation constraint to initialize again the 3D clothing model in the area whose tension degree of apex(es) is marked loose to yield a smooth 3D clothing model that is displayed on the computer display.

Step 3: The computer utilizes an intrinsic image decomposition algorithm and a shape-from-shading algorithm to acquire the detail information of clothing from the input image; shift the acquired detail information of clothing to the smooth 3D clothing mode through the weighted Laplace editing algorithm to yield a final 3D clothing model that is displayed on the computer display.

Firstly, the computer utilizes the intrinsic image decomposition algorithm to decompose the input image into a shading diagram and a reflectogram; utilize the shading diagram and the shape-from-shading algorithm to calculate a relative depth value corresponding to each pixel point; establish a corresponding relation between the clothing area of the input image and the final 3D clothing plane, and calculate the change of the relative depth of each apex of the 3D clothing plane according to the depth value corresponding to the pixel point of the clothing area; renew the final 3D clothing plane according to the calculated change of the relative depth to yield a 3D clothing detail plane.

Then calculate separately the Laplace coordinates of the apex(es) on the final 3D clothing plane and the 3D clothing detail plane; utilize these two Laplace coordinates of the apex(es) to calculate the detail information of surface geometry of the apex(es) on the 3D clothing.

Then utilize the Laplace coordinates of the apex(es) on the smooth 3D clothing model and the calculated detail information of surface geometry to calculate the shortest distance between the apex(es) and the apex(es) of silhouette edge so as to build a weighted Laplace deformation energy function.

Finally, utilize a linear optimization algorithm to minimize the deformation energy function mentioned as above to transfer the detail information of clothing surface geometry to the smooth 3D clothing mode to yield a final 3D clothing model, which is displayed on the computer display.

Wherein: the "calculate a directed surface of each skeleton" described in Step 1 is realized specifically through the processes as follows:

Calculate the skeletons related to the clothing area and mark them as $\{l_i, \ldots, l_j, \ldots, l_n\}$ and define the directed surface $F_{l_i}$ for each related skeleton $l_i$ as follows:

$$F_{l_i}: L^{l_i}_j L n_{L_i} = 0.$$

$$n_{l_i} = R_{l_i}[0\ 0\ 1]^T$$

Wherein: $L^{l_i}_j$ denotes the 3D coordinate(s) of joint(s) related to the skeleton $l_i$, L denotes any point on the directed surface $F_{l_i}$, $n_{l_i}$ denotes the normal of the directed surface $F_{l_i}$, $R_{l_i}$ denotes the rotation matrix of the skeleton $l_i$ which is 3×3; $n_{l_i}$ is determined by the rotation matrix $R_{l_i}$ of the skeleton $l_i$ and only the component on Z axis of $R_{l_i}$ is concerned for calculation, that is, only the rotation component of the skeleton $l_i$ perpendicular to the image plane is concerned.

Wherein: the "calculate the detail information of surface geometry of the apex(es) on the 3D clothing" described in Step 3 is realized specifically through the processes as follows:

Calculate the Laplace coordinate(s) corresponding to the apex(es) $v_i$ on the 3D clothing plane and denote it as $\delta_{v_i}$; similarly, calculate the Laplace coordinate(s) corresponding to the same apex(es) $v_i$ on the 3D clothing detail plane and denote it as $\tilde{\delta}_{v_i}$; define $\xi_{v_i}$ as the detail information of the 3D clothing on the apex(es) $v_i$;

$$\xi_{v_i} = \delta_{v_i} - \tilde{\delta}_{v_i}$$

Wherein: the "calculate the shortest distance between the apex(es) and the apex(es) of silhouette edge so as to build a weighted Laplace deformation energy function" described in Step 3 is realized specifically through the processes as follows:

Build a weighted Laplace editing deformation energy function E to transfer the detail information of clothing to the smooth 3D clothing model:

$$E = \sum_i \left\| L_{v_i} - \tilde{L}_{v_i} - w_i \xi_{v_i} \right\|^2$$

Wherein: $L_{v_i}$ denotes the Laplace coordinate(s) of the apex(es) $v_i$ on the smooth 3D clothing model, $\tilde{L}_{v_i}$ denotes the Laplace coordinate(s) of the apex(es) $v_i$ on the 3D clothing after transferred which is an unknown value needing to be solved, $\xi_{v_i}$ is the detail information of surface geometry of the apex(es) $v_i$ on the 3D clothing, $w_i$ is the transferring weight of the apex(es) $v_i$ which will be calculated as follows:

$$w_i = e^{-\frac{\mu}{d}}$$

Wherein: d denotes the shortest distance between the apex(es) $v_i$ and the apex(es) of silhouette edge on the smooth 3D clothing model and usually $\mu=0.5$:

Compare with the existing techniques, the beneficial features of the present invention are: the method of constructing 3D clothing model based on single image according to the present invention takes full advantages of 3D model of human body of the input image as well as the 3D pose information contained thereof and the shading information of the clothing area of the input image which needs merely single image to generate 3D clothing model with rich surface geometry details such as folds and wrinkles, etc so as to overcome the shortcomings of the existing methods in setting multi-view modeling environment, acquiring geometry detail of verisimilar surface and complex 3D poses of human body, etc.

BRIEF DESCRIPTION OF THE DRAWINGS:

FIG. 1(a-g) are the overall schematic diagram showing the method of constructing 3D clothing model based on single image according to the present invention;

EMBODIMENT

Now the drawings are used to describe an embodiment according to the present invention in order to better understand the present invention. It is necessary to note in particular that: in the description as follows, in the case that the main contents of the present invention may be possibly subject to being weakened if any known function and design is introduced in detail, these descriptions will be omitted here.

Figure 2A:
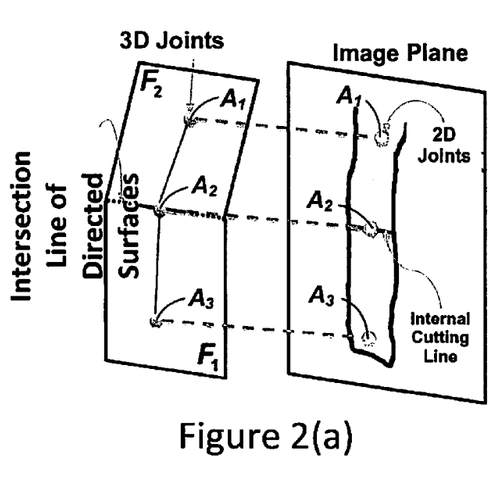
FIG. 2(a) is a schematic diagram showing calculating the internal cutting line(s) of clothing area according to the present invention.
Figure 2B:
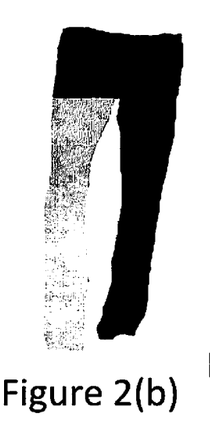
FIG. 2(b) is a schematic diagram showing the result of dividing the clothing area with the internal cutting line(s) according to the present invention.
Figure 2C:
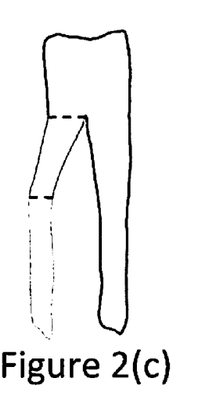
FIG. 2(c) is a schematic diagram showing 3D clothing area according to the present invention.
Figure 3:
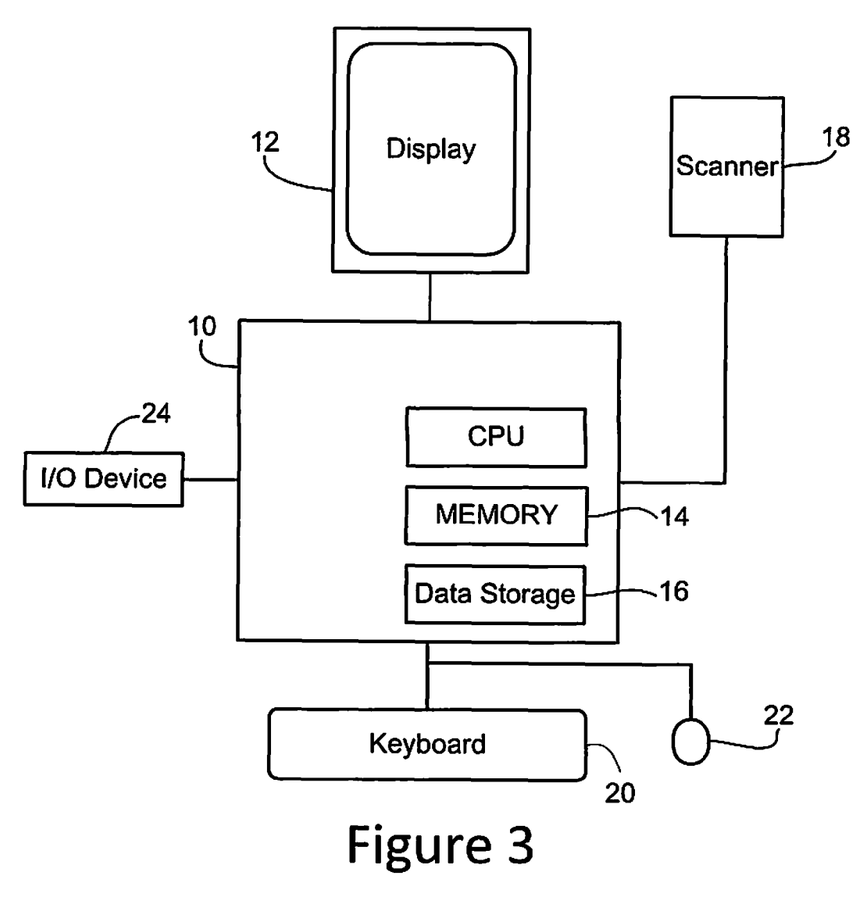
FIG. 3 is a schematic diagram showing a computer that includes a central processing unit (CPU), a display, memory, electronic storage and inputting devices according to the present invention.

As shown schematically in FIG. 3 a computer 10 includes a processor or central processing unit (CPU), a display 12, memory 14, electronic storage 16, such as a hard drive or other data storage device, inputting devices such as a scanner 18, a keyboard 20, a digital device 22 (for example, a mouse or stylus), and an input/output device 24, such as a wireless communication device, Internet connection or network communication device. The computer 10 includes a control program that controls the CPU, display 12, memory 14, storage 16 and receives input from the scanner 18, the keyboard 20 and the digital device 22 and sends and receives data via the output device 24. The computer 10 is also referred to as a controller and can also include other conventional components such as an input interface circuit and an output interface circuit. The memory 14 can include a ROM (Read Only Memory) device and a RAM (Random Access Memory) device. The computer 10 includes graphics processing capability such that digital images can be inputted, analyzed and processed to generate further images and models such that the images and generated models, for instance, the images shown in FIGS. 1 and 2, can be displayed individually or all together on the display 12 and stored in the electronic storage device 16. Further, the computer 10 is programmed and/or provided with the necessary hardware and software to conduct the steps set forth in the method described herein below. The keyboard 20, the digital device 22 (the mouse) and display 12 define a user interface such that a user (not shown) can input data, and interact with the computer 10 to guide the process and method described herein below. It will be apparent to those skilled in the art from this disclosure that the precise structure and algorithms for the computer 10 (the controller) can be any combination of hardware and software that will carry out the functions of the present invention.

Figure 1:
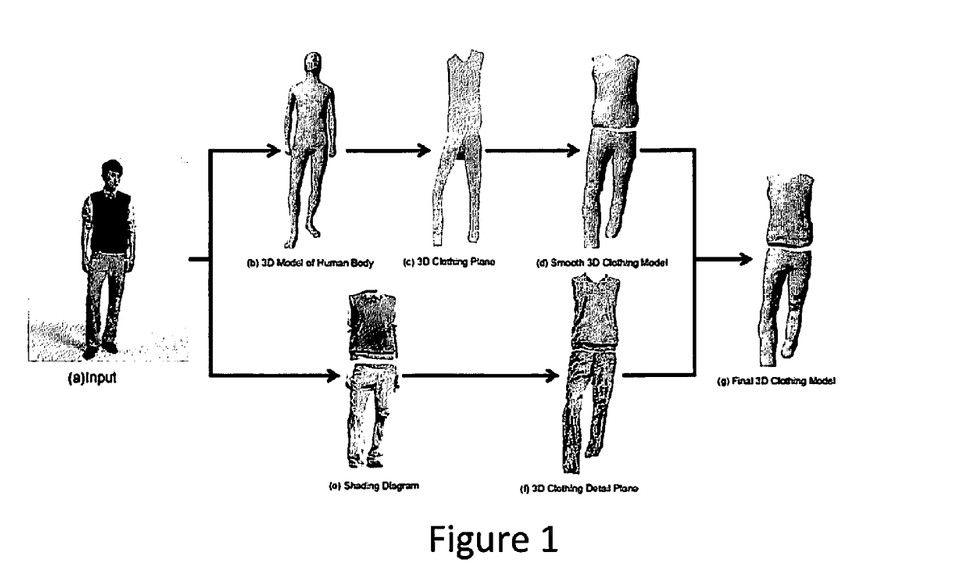

With reference to FIG. 1(a-g), the present invention is illustrated with a series of images generated by the computer 10 that has been provided with a single scanned inputted image. The single inputted image (FIG. 1(a)) can be digitally inputted or can be scanned to produce a digital image using the scanner 18. The images generated by the computer 10 are based on analysis and modeling of the data in the inputted image. The computer 10 utilizes a method of constructing 3D clothing model based on the single inputted image, the method comprising the steps as follows:

Step 1: To estimate 3D model of human body of and construct 3D clothing plane according to the clothing silhouette of the input image and subsequently displaying the 3D clothing plane on a display of the computer 10.

First, utilize a method of semi-automatic 3D pose estimation method to estimate 3D pose(s) of human body of the input image (as shown in FIG. 1(a)) according to 2D joint(s) of human body in the input image specified by user; estimate the 3D model of human body in the input image (as shown in FIG. 1(b)) through a method of deformable template according to a human contour line specified in the input image by user and the estimated 3D pose(s) of human body. The computer generates the 3D pose(s) of human body and 3D model of the human body and stores them in memory and/or in the electronic storage device 16 of the computer 10 such they can be displayed on the display 12 of the computer 10.

Then, the user (not shown)using the inputting devices (i.e., the keyboard 20 and/or the mouse 22) specifies a clothing silhouette in the input image; utilizes the estimated 3D model of human body to divide the clothing silhouette specified by user into silhouette edge and boundary outline. The principle of dividing is: in the case that one outline specified by user crosses the project area of the 3D model of human body on the image, it will be divided as boundary outline; otherwise, it will be divided as silhouette edge.

Thirdly, project the estimated 3D model of human body on the image plane to calculate the overlap area between the projection area and the clothing area specified by user; calculate the skeletons related to the clothing area according to the overlap area and the skeleton dividing of the 3D model of human body and set them as $\{l_i, \ldots, l_i, \ldots, l_n\}$.

Fourthly, define the directed surface $F_{l_i}$ as follows for each related skeleton $l_i$ (as shown in FIG. 2(a), $L_1$ and $L_2$ are two directed surfaces):

$$F_{l_i}: L^{h_i}_j L n_{l_i} = 0.$$

$$n_{l_i} = R_{l_i}[0\ 0\ 1]^T$$

Wherein: $L^{h_i}_j$ denotes the 3D coordinate(s) of joint(s) related to the skeleton $l_i$ (as shown in FIG. 2(a), L denotes any point on the directed surface $F_{l_i}$, $n_{l_i}$ denotes the normal of the directed surface $f_{l_i}$, $R_{l_i}$ denotes the rotation matrix of the skeleton $l_i$ which is 3×3; $n_{l_i}$ is determined by the rotation matrix $R_{l_i}$ of the skeleton $l_i$ and only the component on Z axis of $R_{l_i}$ is concerned for calculation, that is, only the rotation component of the skeleton $l_i$ perpendicular to the image plane is concerned Fifthly, calculate the intersection line between two adjacent surfaces. At the left side of FIGS. 2(a), $L_1$ and $L_2$ are two adjacent directed surfaces in a 3D space and the intersection line between $L_1$ and $L_2$ is shown as the dotted line; project the calculated intersection line on the image plane; utilize the coordinates of the intersection line after projection and the corresponding joints on the image to calculate one internal cutting line in the clothing area of the input image as shown in the right of FIG. 2(a); all the calculated internal cutting lines divide the clothing area of the input image into various parts as shown FIG. 2(b) where different colors indicate different part of the clothing area. It is necessary to note that each constituting part corresponds to one directed surface. It is necessary to note that: during the course of dividing the constituting parts, it needs to merge the directed surfaces with same direction as well as their corresponding parts. The deep colors show the merged parts constituting the clothing area.

Sixthly: project the outlines (including silhouette edge and/or boundary outline) and the corresponding internal cutting lines of each part constituting the clothing area of the input image on the directed surface corresponding to each part to form the 3D clothing area for each constituting part as shown in FIG. 2(a). As shown in FIG. 2(c), the solid line shows the outline(s) after projection and the dotted line(s) show the internal cutting line(s) after projection.

Seventhly: triangulate the 3D clothing area of each constituting part on the corresponding directed surface to form multiple triangular meshes of clothing area; utilize the apex(s) $A_1$, $A_2$ and/or $A_3$ of common internal cutting line(s) among 3D clothing areas to compose a triangular meshing of clothing area where two triangular meshing of clothing areas share same apex(s) of internal cutting line(s) to form the initial 3D clothing plane.

Finally, duplicate the initial 3D clothing plane (FIG. 1(a); utilize the apex(s) $A_1$, $A_2$ and/or $A_3$ of the silhouette edge on the initial 3D clothing plane (FIG. 2(a) as the common apex(s) to combine these initial 3D clothing planes before and after duplication where both initial 3D clothing planes share same apex(s) of silhouette edge to form the final 3D clothing plane $M_o$ as shown in FIG. 1(c). Wherein: the initial 3D clothing plane before duplication forms the front side of clothing and the duplicated initial 3D clothing plane forms the back side of clothing.

Step 2: To utilize the final 3D clothing plane and the 3D model of human body to yield a smooth 3D clothing model through a deformation algorithm.

Firstly, utilize the Laplace deformation algorithm to deform the 3D clothing plane where the process of deformation is required that (1) the position(s) of the apex(s) of silhouette edge and the position(s) of the apex(s) of boundary outline will be kept unchanged as much as possible; (2) the position(s) of the apex(s) after deformation will be outside the 3D model of human body and will not collide with human body; the initial 3D clothing model is generated after deformation.

Then, calculate the shortest distance between the apex(s) of silhouette edge and the surface of 3D model of human body; build an exponential decay function to normalize this distance to be between 0-1 which is set as the tension degree on the apex(s) of silhouette edge where 0 denotes being loose and 1 denotes being tight; spread the tension degree of the apex(s) of silhouette edge to all the apex(s) of the initial 3D clothing model where the spreading process is required that: (1) the tension degrees of adjacent apexes are similar; (2) the spreading has a higher weight along the direction perpendicular to the skeleton and a lower weight along other directions; after spreading, each apex of the initial 3D clothing model will have a value of tension degree.

Finally, renew the initial 3D clothing model in the area(s) of 0 tension degree on the apex(s) (that is, these areas marked as being loose) through using the rotation surface, where the process of renewing is required that: (1) the positions of the apex(s) of silhouette edge and the positions of the apex(s) of boundary outline will be kept unchanged as much as possible; (2) the component of the normal vector of the apex on the rotation axis should be maintained as much as possible along the rotation direction of the rotation surface; (3) the component of the normal vector of the apex in the rotation direction should be maintained as much as possible along the direction of rotation axis of the rotation surface; (4) the clothing won't collide with the human body; a smooth 3D clothing model $M_1$ will be yielded after renewing which is as shown in FIG. 1(d).

Step 3: To utilize the intrinsic image decomposition algorithm and the shape-from-shading algorithm to acquire the detail information of clothing from the input image; shift the acquired detail information of clothing to the smooth 3D clothing mode through the weighted Laplace editing algorithm to yield a final 3D clothing model.

Firstly, utilize the intrinsic image decomposition algorithm to decompose the input image I into a shading diagram S and a reflectogram R where the process of decomposition is required that: $I_p=S_p R_p$ is needed for the pixel point p, wherein: $I_p$ denotes the intensity value of p on the input image I, $S_p$ denotes the intensity value of p on the shading diagram S and $R_p$ denotes the intensity value of P on the reflectogram R.

Then utilize the shading diagram S (as shown in FIG. 1(e)) and the shape-from-shading algorithm to calculate the relative depth value $D_p$ corresponding to each pixel point P; establish a corresponding relation between the clothing area of the input image and the final 3D clothing plane, and calculate the change of the relative depth of each apex on the final 3D clothing plane $M_o$ according to the relative depth value corresponding to the pixel point of the clothing area; renew the final 3D clothing plane $M_o$ according to the calculated change of the relatiye depth to yield the 3D clothing detail plane $\tilde{M}_o$ which is as shown in FIG. 1(f).

Then calculate the Laplace coordinate(s) corresponding to the apex(s) $v_i$ on $M_o$ and denote it as $\delta_{v_i}$; similarly, calculate the Laplace coordinate(s) corresponding to the same apex(s) $v_i$ on $\tilde{M}_o$ and denote it as $\tilde{\delta}_{v_i}$; define $\delta_{v_i}$ as the detail information of the 3D clothing on the apex(s) $v_i$:

$$\xi_{v_i}=\tilde{\delta}_{v_i}-\delta_{v_i}$$

Fourthly, build a weighted Laplace editing deformation energy function E to transfer the detail information $\xi_{v_i}$ of clothing to the smooth 3D clothing model $M_1$;

$$E = \sum_i \left\| L_{v_i} - \tilde{L}_{v_i} - w_i \xi_{v_i} \right\|^2$$

Wherein: $L_{v_i}$ denotes the Laplace coordinate(s) of the apex(s) $v_i$ on $M_1$, $\tilde{L}_{v_i}$ denotes the Laplace coordinate(s) of the apex(s) $v_i$ on the 3D clothing after transferred which is an unknown value needing to be solved, $w_i$ is the transferring weight of the apex(s) $v_i$ which will be calculated as follows:

$$w_i = e^{-\frac{\mu}{d}}$$

Wherein: d denotes the shortest distance between the apex(s) $v_i$ and the apex(s) of silhouette edge on $M_1$ and usually $\mu=0.5$.

Finally, the linear optimization algorithm is used to minimize the energy function E, that is, $$\arg\min_{\tilde{v}} E \qquad 5$$

($\tilde{v}$ indicates the position(s) of the apex(s) of the 3D clothing after transferred). Thus, a 3D clothing model $\tilde{M}_1$ after transferred is yielded, that is, the final 3D clothing model which is as shown in FIG. 1(g). Although an explanatory embodiment according to the present invention is described above to facilitate the understanding of the *sent invention by those skilled in the art, it should be obvious that the present invention shall not be limited to the scope of the embodiment. For the general technical personnel in the art, as long as any change lies in the spirit and scope of the present invention as limited and specified by the claims attached, such change will be obvious and any invention and creation taking advantage of the conception of the present invention shall be protected herein accordingly.

What is claimed is:

1. A computer system configured to construct a 3D clothing model based on a single image inputted into a computer having computer graphics, comprising:
 a computer having a processor, data storage device, a display, at least one inputting device and at least one user interface device,
 the computer being configured to perform the following operations:
 inputting an image of a person and generating an inputted image corresponding to the image;
 estimating a 3D model of human body based on the inputted image of the person and constructing a 3D clothing plane according to a clothing silhouette corresponding to the person in the inputted image;
 displaying the inputted image, the 3D model of human body and the 3D clothing plane on the display;
 utilizing a method of semi-automatic 3D pose estimation method to estimate estimated 3D pose(s) of human body of the inputted image according to 2D joint(s) of human body in the inputted image specified by a user via the user interface device viewing the display;
 estimating the 3D model of human body in the inputted image through a method of deformable template according to a human contour line specified in the inputted image by the user and the estimated 3D pose(s) of human body;
 specifying the clothing silhouette by the user in the inputted image; utilizing the 3D model of human body to divide the clothing silhouette specified by the user into silhouette edge and boundary outline;
 calculating a projection area of the 3D model of human body on the inputted image and a skeleton related to a clothing area;
 calculating a directed surface for the skeleton related to the clothing area through 3D coordinate(s) of skeleton joint(s) and a relative rotation matrix;
 calculating an intersection line between adjacent directed surfaces used to calculate an internal cutting line of the clothing area of the inputted image;
 utilizing the internal cutting line to divide the clothing area of the inputted image into different parts of which each corresponding to one directed surface;
 projecting the boundary outline and the internal cutting line of each part of the clothing area of the inputted image on the corresponding directed surface to form 3D clothing area of each part accordingly and display on the display;
 triangulating the 3D clothing area of each part and utilize apex(s) of common ones of the internal cutting lines between different 3D clothing areas to form an initial 3D clothing plane;
 duplicating the initial 3D clothing plane; utilizing the apex(s) of the silhouette edge on the initial 3D clothing plane as common ones of the apex(s) to combine these initial 3D clothing planes before and after duplication to form a final 3D clothing plane;
 utilizing the final 3D clothing plane and the 3D model of human body to yield a smooth 3D clothing model through a deformation algorithm;
 utilizing a Laplace deformation algorithm to deform the final 3D clothing plane under a set of constraints of outline apex(s) and the 3D model of human body to initialize a 3D clothing model; then calculating a tension degree of each apex of the initial 3D clothing model through calculating the shortest distance between the apex(s) of silhouette edge and the surface of the 3D model of human body; utilizing a rotating surface as a deformation constraint to initialize again the 3D clothing model in the area whose tension degree of apex(s) is marked loose to yield a smooth 3D clothing model;
 utilizing an intrinsic image decomposition algorithm and a shape-from-shading algorithm to acquire detail information of clothing from the inputted image; shifting acquired detail information of clothing to the smooth 3D clothing mode through a weighted Laplace editing algorithm to yield a final 3D clothing model;
 utilizing the intrinsic image decomposition algorithm to decompose the inputted image into a shading diagram and a reflectogram; utilizing the shading diagram and the shape-from-shading algorithm to calculate a relative depth value corresponding to each pixel point; establishing a corresponding relation between the clothing area of the inputted image and the final 3D clothing plane, and calculating a change of relative depth of each apex on the final 3D clothing plane according to the depth value corresponding to the pixel point of the clothing area; renewing the final 3D clothing plane according to calculated change of relative depth to yield a 3D clothing detail plane;
 calculating separately Laplace coordinates of the apex(s) on the final 3D clothing plane and the 3D clothing detail plane; utilizing these two Laplace coordinates of the apex(s) to calculate detail information of surface geometry of the apex(s) on the 3D clothing;
 utilizing the Laplace coordinates of the apex(s) on the smooth 3D clothing model and calculated detail information of surface geometry to calculate the shortest distance between the apex(s) on the 3D clothing and the apex(s) of silhouette edge so as to build a weighted Laplace deformation energy function;
 utilizing a linear optimization algorithm to minimize the weighted Laplace deformation energy function mentioned as above to transfer the detail information of clothing surface geometry to the smooth 3D clothing mode to yield a revised final 3D clothing model; and
 displaying the final 3D clothing model on the display and store the final 3D clothing model in the data storage device.

2. The computer system according to claim 1, characterized in that:
the processor of the computer is configured to calculate the directed surface of each skeleton as follows:
calculate the skeletons related to the clothing area and mark them as $\{l_i, \ldots, l_I, \ldots, l_n\}$ and define the directed surface $F_{l_i}$ for each related skeleton $l_i$ as follows:

$$F_{l_i}:L^{l_i}_j L n_{l_i}=0,$$

$$n_{l_i}=R_{l_i}[0\ 0\ 1]^T$$

wherein: $L^{l_i}_j$ denotes the 3D coordinate(s) of joint(s) related to the skeleton $l_i$, L denotes any point on the directed surface $F_{l_i}$, $n_{l_i}$ denotes the normal of the directed surface $F_{l_i}$, $R_{l_i}$ denotes the relative rotation matrix of the skeleton $l_i$ which is 3×3; $n_{l_i}$ is determined by the rotation matrix $R_{l_i}$ of the skeleton $l_i$ and only the component on Z axis of $R_{l_i}$ is concerned for calculation, that is, only the rotation component of the skeleton $l_i$ perpendicular to the image plane is concerned.

3. The computer system according to claim 1, characterized in that:
the calculating the detail information of surface geometry of the apex(s) on the 3D clothing is realized specifically by the processor of the computer through the processes as follows:
calculate Laplace coordinate(s) corresponding to the apex(s) $v_i$ on the 3D clothing plane and denote it $\delta_{v_i}$; as similarly, calculate Laplace coordinate(s) corresponding to the same apex(s) $v_i$ on the 3D clothing detail plane and denote it as $\delta_{v_i}^\circ$; define $\xi_{v_i}$ as the detail information of the 3D clothing on the apex(s) $v_i$;

$$\xi_{v_i}=\delta_{v_i}-\delta_{v_i}^\circ.$$

4. The computer system according to claim 1, characterized in that:
the calculating the shortest distance between the apex(s) on the 3D clothing and the apex(s) of silhouette edge so as to build the weighted Laplace deformation energy function by the processor of the computer is realized through the processes as follows:
build a weighted Laplace editing deformation energy function E to transfer the detail information of clothing to the smooth 3D clothing model:

$$E = \sum_i \left\| L_{v_i} - \tilde{L}_{v_i} - w_i \xi_{v_i} \right\|^2$$

wherein: $L_{v_i}$ denotes the Laplace coordinate(s) of the apex(s) $v_i$ on the smooth 3D clothing model, $\tilde{L}_{v_i}$ denotes the Laplace coordinate(s) of the apex(s) $v_i$ on the 3D clothing after transferred which is an unknown value needing to be solved, $\xi_{v_i}$ is the detail information of surface geometry of the apex(s) $v_i$ on the 3D clothing, $w_i$ is the transferring weight of the apex(s) $v_i$ which will be calculated as follows:

$$w_i = e^{-\frac{\mu}{d}}$$

wherein: d denotes the shortest distance between the apex(s) $v_i$ and the apex(s) of silhouette edge on the smooth 3D clothing model and usually $\mu=0.5$.

5. A method of constructing 3D clothing model based on a single image inputted into a computer having computer graphics, comprising:
inputting an image of a person into a computer such that a processor of the computer generates an inputted image corresponding to the image of the person;
a processor of the computer estimating, by the processor of the computer a 3D model of human body based on the inputted image of the person and the processor of the computer constructing a 3D clothing plane according to a clothing silhouette corresponding to the person in the inputted image;
displaying the inputted image, the 3D model of human body and the 3D clothing plane on a display of the computer;
utilizing a method of semi-automatic 3D pose estimation method performed by the processor of the computer to estimate estimated 3D pose(s) of human body of the inputted image according to 2D joint(s) of human body in the inputted image specified by a user using a user interface device of the computer, including:
estimating the 3D model of human body in the inputted image through a method of deformable template according to a human contour line specified in the inputted image by the user and the estimated 3D pose(s) of human body;
specifying the clothing silhouette by the user in the inputted image; utilizing the 3D model of human body to divide the clothing silhouette specified by the user into silhouette edge and boundary outline;
calculating performed by the processor of the computer of a projection area of the 3D model of human body on the inputted image and a skeleton(s) related to clothing area, including:
calculating a directed surface for the skeleton related to the clothing area through 3D coordinate(s) of skeleton joint(s) and a relative rotation matrix;
calculating an intersection line between adjacent directed surfaces used to calculate an internal cutting line of the clothing area of the inputted image;
utilizing the internal cutting line to divide the clothing area of the inputted image into different parts of which each corresponding to one directed surface;
projecting, performed by the processor of the computer, the boundary outline and the internal cutting line of each part of the clothing area of the inputted image on the corresponding directed surface to form 3D clothing area of each part accordingly;
triangulating the 3D clothing area of each part and utilize apex(s) of common ones of the internal cutting lines between different 3D clothing areas to form an initial 3D clothing plane; duplicating the initial 3D clothing plane; utilizing the apex(s) of the silhouette edge on the initial 3D clothing plane as common ones of the apex(s) to combine these initial 3D clothing planes before and after duplication to form a final 3D clothing plane;
utilizing the final 3D clothing plane and the 3D model of human body to yield a smooth 3D clothing model through a deformation algorithm performed by the processor of the computer;
utilizing a Laplace deformation algorithm to deform the final 3D clothing plane under a set of constraints of outline apex(s) and the 3D model of human body to initialize a 3D clothing model as performed by the processor of the computer; then calculating a tension degree of each apex of the initial 3D clothing model through calculating the shortest distance between the apex(s) of silhouette edge and the surface of the 3D model of human body; utilizing rotating surface as a deformation constraint to initialize again the 3D clothing model in the area whose tension degree of apex(s) is marked loose to yield a smooth 3D clothing model;

utilizing an intrinsic image decomposition algorithm and a shape-from-shading algorithm performed by the processor of the computer to acquire detail information of clothing from the inputted image; shifting acquired detail information of clothing to the smooth 3D clothing mode through a weighted Laplace editing algorithm to yield a final 3D clothing model;

utilizing the intrinsic image decomposition algorithm performed by the processor of the computer to decompose the inputted image into a shading diagram and a reflectogram; utilizing the shading diagram and the shape-from-shading algorithm to calculate a relative depth value corresponding to each pixel point; establishing a corresponding relation between the clothing area of the inputted image and the final 3D clothing plane, and calculating a change of relative depth of each apex on the final 3D clothing plane according to the depth value corresponding to the pixel point of the clothing area; renewing the final 3D clothing plane according to calculated change of relative depth to yield a 3D clothing detail plane;

calculating separately Laplace coordinates of the apex(s) on the final 3D clothing plane and the 3D clothing detail plane performed by the processor of the computer; utilizing these two Laplace coordinates of the apex(s) to calculate detail information of surface geometry of the apex(s) on the 3D clothing; utilizing the Laplace coordinates of the apex(s) on the smooth 3D clothing model and calculated detail information of surface geometry to calculate the shortest distance between the apex(s) on the 3D clothing and the apex(s) of silhouette edge so as to build a weighted Laplace deformation energy function;

utilizing a linear optimization algorithm to minimize the weighted Laplace deformation energy function mentioned as above to transfer the detail information of clothing surface geometry to the smooth 3D clothing mode to yield a revised final 3D clothing model; and displaying the final 3D clothing model on the display and store the final 3D clothing model in the data storage device.

6. The method according to claim 5, characterized in that: the calculating of the directed surface of each skeleton by the processor of the computer is realized specifically through processes as follows:

calculate the skeletons related to the clothing area and mark them as $\{l_i, \ldots, l_i, \ldots, l_n\}$ and define the directed surface $F_{l_i}$ for each related skeleton $l_i$ as follows:

$F_{l_i}:L^{l_i}_j Ln_{l_i}=0$, $n_{l_i}=R_{l_i}[0\ 0\ 1]^T$ wherein: $L^{l_i}_j$ denotes the 3D coordinate(s) of joint(s) related to the skeleton $l_i$, L denotes any point on the directed surface $F_{l_i}$, $n_{l_i}$ denotes the normal of the directed surface $F_{l_i}$, $R_{l_i}$ denotes the relative rotation matrix of the skeleton $l_i$ which is 3×3; $n_{l_i}$ is determined by the rotation matrix $R_{l_i}$ of the skeleton $l_i$ and only the component on Z axis of $R_{l_i}$ is concerned for calculation, that is, only the rotation component of the skeleton $l_i$ perpendicular to the image plane is concerned.

7. The method according to claim 5, characterized in that: the calculating the detail information of surface geometry of the apex(s) on the 3D clothing performed by the processor of the computer is realized specifically through the processes as follows:

calculate Laplace coordinate(s) corresponding to the apex(s) $v_i$ on the 3D clothing plane and denote it as $\delta_{v_i}$; similarly, calculate Laplace coordinate(s) corresponding to the same apex(s) $v^i$ on the 3D clothing detail plane and denote it as $\tilde{\delta}_{v_i}$; define $\xi_{v_i}$ as the detail information of the 3D clothing on the apex(s) $v_i$;

$\xi_{v_i}=\tilde{\delta}_{v_i}-\delta_{v_i}$.

8. The method according to claim 5, characterized in that: the calculating the shortest distance between the apex(s) on the 3D clothing and the apex(s) of silhouette edge performed by the processor of the computer so as to build the weighted Laplace deformation energy function is realized specifically through the processes as follows:

build a weighted Laplace editing deformation energy function E to transfer the detail information of clothing to the smooth 3D clothing model:

$$E = \sum_i \left\| L_{v_i} - \tilde{L}_{v_i} - w_i \xi_{v_i} \right\|^2$$

wherein: $L_{v_i}$ denotes the Laplace coordinate(s) of the apex(s) $v_i$ on the smooth 3D clothing model, $\tilde{L}_{v_i}$ denotes the Laplace coordinate(s) of the apex(s) $v_i$ on the 3D clothing after transferred which is an unknown value needing to be solved, $\xi_{v_i}$ is the detail information of surface geometry of the apex(s) $v_i$ on the 3D clothing, $w_i$ is the transferring weight of the apex(s) $v_i$ which will be calculated as follows:

$$w_i = e^{-\frac{\mu}{d}}$$

wherein: d denotes the shortest distance between the apex(s) $v_i$ and the apex(s) of silhouette edge on the smooth 3D clothing model and usually $\mu=0.5$.

* * * * *